(12) United States Patent
Damiano et al.

(10) Patent No.: US 6,849,830 B2
(45) Date of Patent: Feb. 1, 2005

(54) APPARATUS AND METHOD OF RAPIDLY AND EVENLY HEATING A PACKAGED FOOD PRODUCT

(75) Inventors: Dominick Damiano, Danbury, CT (US); Brita Frangsmyr Sheehan, New Milford, CT (US); Hua Zhang, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/648,066

(22) Filed: Aug. 25, 2003

(65) Prior Publication Data

US 2004/0065658 A1 Apr. 8, 2004

Related U.S. Application Data

(63) Continuation of application No. PCT/EP02/01999, filed on Feb. 21, 2002.
(60) Provisional application No. 60/271,904, filed on Feb. 27, 2001.

(51) Int. Cl.[7] .............................. H05B 3/68; A47J 36/24
(52) U.S. Cl. ........................ 219/386; 219/487; 219/485; 219/494; 219/497; 99/372; 99/380
(58) Field of Search ................................. 219/385, 386, 219/402, 404, 407, 483, 485, 494, 497, 524, 525, 411; 222/146.5; 99/372, 374, 377, 380, 382

(56) References Cited

U.S. PATENT DOCUMENTS

| | | | | |
|---|---|---|---|---|
| 1,874,836 A | * | 8/1932 | Trenner et al. ............. | 219/407 |
| 3,130,288 A | * | 4/1964 | Monaco et al. ............. | 219/385 |
| 3,304,406 A | * | 2/1967 | King .......................... | 219/411 |
| 3,678,248 A | | 7/1972 | Tricault et al. ............. | 219/525 |
| 3,805,018 A | * | 4/1974 | Luong et al. ................ | 219/387 |
| 3,974,358 A | * | 8/1976 | Goltsos ....................... | 219/411 |
| 3,978,238 A | | 8/1976 | Frey et al. ................... | 426/523 |
| 4,102,256 A | | 7/1978 | John et al. .................... | 99/372 |
| 4,241,650 A | * | 12/1980 | John et al. .................. | 219/525 |
| 4,731,251 A | * | 3/1988 | Jovanovic ................... | 219/411 |
| 5,274,215 A | * | 12/1993 | Jackson ...................... | 219/439 |
| 5,655,434 A | * | 8/1997 | Liebermann ................. | 99/330 |
| 5,708,255 A | * | 1/1998 | Lamanna et al. ........... | 219/385 |
| 6,150,635 A | | 11/2000 | Hannon et al. ............. | 219/386 |
| 6,175,099 B1 | * | 1/2001 | Shei et al. ................... | 219/385 |
| 6,607,766 B2 | * | 8/2003 | Ewald et al. ................ | 219/395 |
| 6,653,602 B2 | * | 11/2003 | Li ............................... | 219/432 |

FOREIGN PATENT DOCUMENTS

| DE | 2449570 A | * | 4/1976 |
|---|---|---|---|
| DE | 10114201 A1 | * | 11/2001 |
| JP | 02269625 A | * | 11/1990 |
| RU | WO9825505 A1 | * | 6/1998 |

* cited by examiner

*Primary Examiner*—Joseph Pelham
(74) *Attorney, Agent, or Firm*—Winston & Strawn LLP

(57) ABSTRACT

The invention relates to a method for vending food products in food outlets. The method includes the steps of providing a heating cavity having thermal conductive heating surfaces; placing a container including the food product into the heating cavity, the container engaging at least a first and second surfaces of the thermal conductive heating surfaces; resistively energizing the heating surfaces for heating the food product through conduction of thermal energy to produce a heated food product; and opening the container and serving the heated food product. The invention also relates to a portable, compact and space saving heating apparatus.

29 Claims, 10 Drawing Sheets

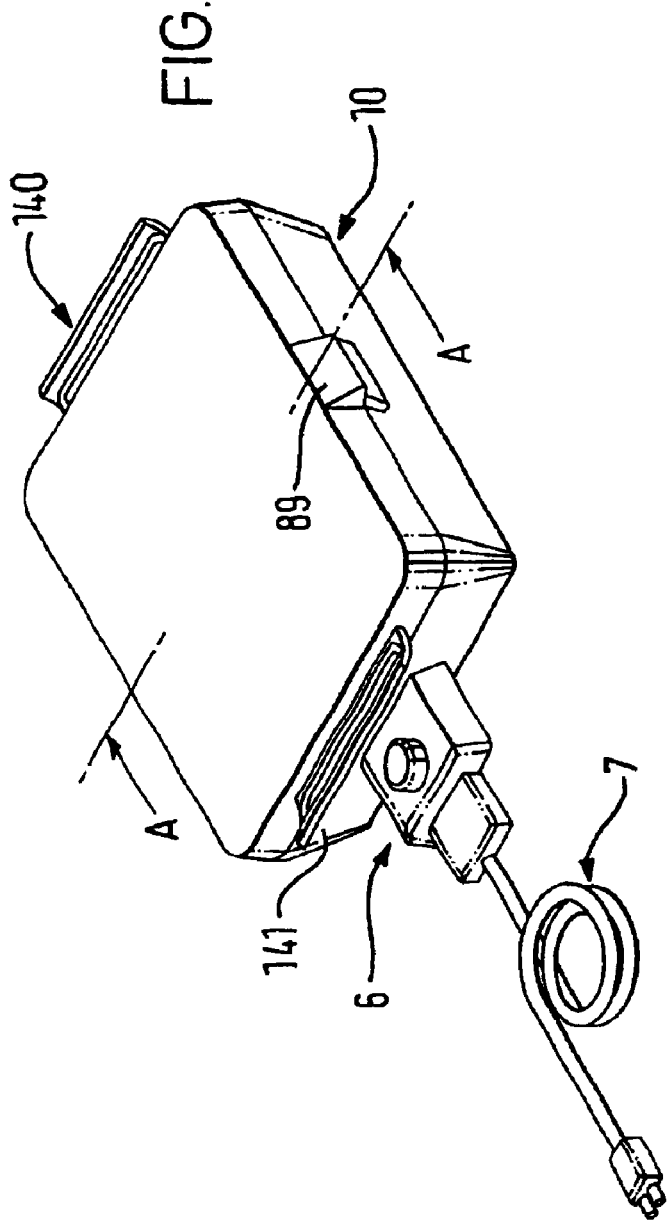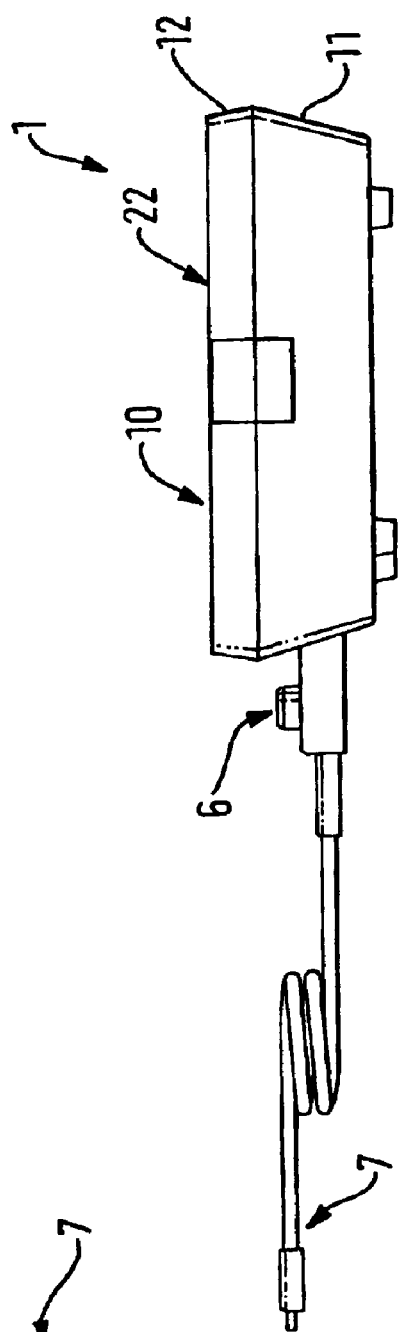

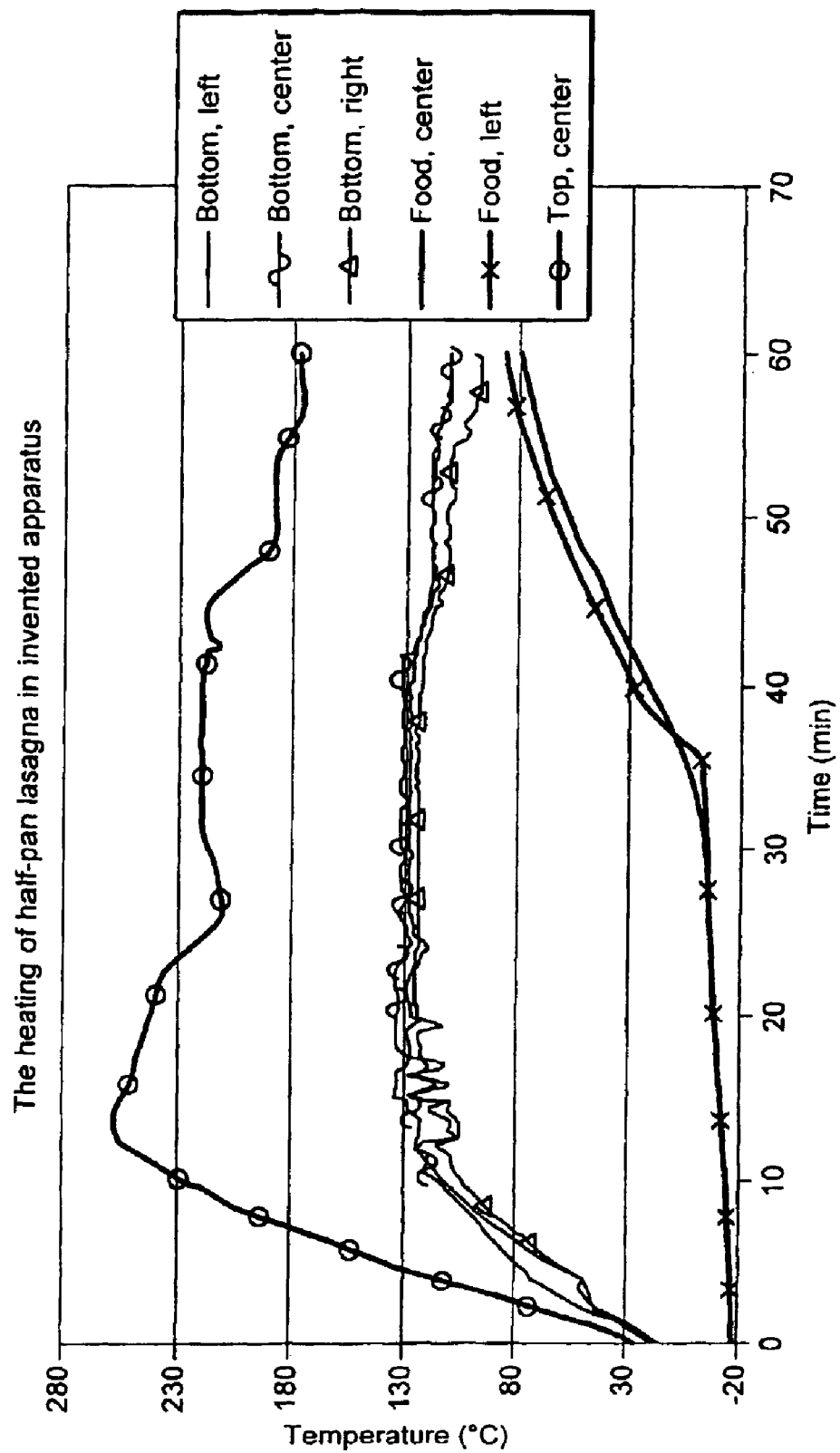

APPARATUS AND METHOD OF RAPIDLY AND EVENLY HEATING A PACKAGED FOOD PRODUCT

CROSS-REFERENCE TO RELATED APPLICATIONS

The present application is a continuation of International application PCT/EP02/01999 filed Feb. 21, 2002, the entire content of which is expressly incorporated herein by reference thereto, and claims the benefit of U.S. provisional application Ser. No. 60/271,904 filed Feb. 27, 2001.

FIELD OF THE INVENTION

The invention relates to the domain of heating packaged food for providing hot food from shelf stable, refrigerated or frozen food. More specifically, the present invention relates to heating food stored in a container in a simple, convenient and inexpensive manner using primarily direct contact heating means. The invention also relates to a method for reducing the space required in food outlets.

BACKGROUND OF THE INVENTION

In the foodservice industry, it is common to serve prepared food from steam or "Sterno" flame tables. These are devices which hold hot for serving standard sizes of "pans" of food that are typically found in canteens, banquet halls, delis, corner shops and cafeteria serving lines. Typically, the food is prepared hot in the back room and is then placed into the pans for holding hot for serving. Serious food safety problems and in particular drying out of the food, are frequently reported with those heating tables. Some industrial companies also provide similarly prepared food products as quality and convenience alternatives for foodservice operators. These products are usually sold frozen or refrigerated, and heating is required before serving to a hot temperature, i.e. at least 71° C., for safety reasons, and for consumption at temperatures where consumers can enjoy the food the most, i.e. about 55° C. These products are most commonly manufactured and sold in partial "pan" sizes (e.g., ½ and ⅓ "pan" sizes) and most commonly packaged in a lidded container such as in gauge aluminum foil.

Most often, these products are heated to serving temperature in a conventional oven similar to a residential oven. However, this method of heating has proved to be slow, as radiation heat transfer from oven wall to the package surface is relatively poor in the case of the aluminum packaging. The aluminum package has a tendency to reflect heat, resulting in the primary mode of heat transfer to be natural convection in this case. Increase of the heat transfer may be obtained by circulating hot air around the packaging as in forced air convection ovens, which are used by foodservice operators. Another enhancement is to add steam to the air to get more rapid heating but, this method may adversely affect the quality of the food product. Other methods consist of microwave heating the food product by removing the food product from the original aluminum packaging and by placing it into a special plastic tray adapted to microwave heating. Apart from the fact this requires operator's manipulations, microwave heating provides uneven heating with hot and cold spots that require rest time for the temperature to even out. The use of a combination of microwave and convection is known which provides improved results, but is relatively expensive and requires high amperage electrical connections and large amounts of electricity and also requires special packaging adapted for microwave use. In all cases of these various types of ovens, the equipment is relatively expensive, complicated and large. Once located the equipment must be used in its "place", most typically what is referred to as "back of the house".

Regardless whether a conventional or convection oven is used, often the food at the edges and corners are overheated and sometimes burnt, lowering the overall quality of the prepared food. This occurs because the food product at the edges and corners is getting heated from 2 or 3 sides and at the same time is close to the surfaces. Thus, it would be desirable to have a heating method whereby the amount of heat can be controlled to a lower amount in the areas of the tray which are prone to overheating and burning. Also, if different foods are placed in a tray (e.g., meat loaf and mashed potatoes), it would be advantageous to have different amounts of heat to be applied to different parts of the tray for various food components. In conventional or convection ovens, there is no way, for the most part, to lessen the amount of heat to these edges and corners or to control different amounts of heat to different regions of trays, except to change to more complicated and expensive packaging.

In the foodservice area, the food may usually come in large-size frozen portions of several kilograms. As a matter of example, a standard "half-pan" lasagna packaged in an aluminum tray of 2.7 kg requires about 1950 kJ of energy (including moisture losses) and may take more than 125 minutes in a conventional oven to be heated from frozen to an acceptable hot temperature for serving. Foodservice operators are less and less inclined to accept so long heating times. One possibility is to divide the food in several smaller portions which are put in smaller containers, trays or dishes. However, this is labor intensive and it requires more attention from skilled operators. Therefore, there is a need for conveniently, rapidly and cleanly heating food originally packed in medium to large size packages without the requirement to remove the food from their packages so that labor is kept to a minimum and the food can be easily transferred to the point of service in hot conditions.

Usually, once the food is heated in the "back room" to serving temperature, it is brought to the "front of the house" and placed in a steam table, or a chafing dish with a "Sterno" flame, to be held hot. Steam tables, however, are quite large, not inexpensive, typically take about 45 minutes to one hour to preheat, and are very labor intensive to clean. Steam tables work by heating water to create a hot, humid air environment under the food tray. Consequently, the packaging of the food product is limited to things such as aluminum or plastic unless a special liner is used. Therefore, it would be desirable to provide equipment that is quicker, simpler and reasonably low in cost, small and portable in some situations, and easy to use.

Food warmers are known which are designed to receive for heating an open tray-shaped member for different food containers such as dishes or pans. However, the heating capacity of those warming devices is limited as the energetic loss to the environment is high due to the open configuration. Increasing the electric power of those devices to compensate for heat loss may lead to the violation of domestic electrical safety regulations which require precise electrical power limits not to be exceeded. Thus, the food warmers are generally used just for holding food warm or heating small size portions from ambient to warm but they are not capable of handling the heating of large portions of food, especially, when the food is originally in frozen or chilled state in the plate. For instance, U.S. Pat. No. 3,043,943 to J. R. Moot relates to a portable food warmer, and more particularly to a tray adapted to heat food and dishes containing food to serving temperature. The food warmer comprises a dish supporting member, an inner heat diffusing member and heating elements between the heat diffusing member and a heat insulator. Sloping top flanges are provided to delimit the contour of the open upper cavity so that dishes of different sizes and capacity can be heated in contact to the dish supporting member.

Numerous patents relate to foodservice systems wherein individual portions of precooked food are supported on trays installed within moveable carts. The carts are usually placed in a chilled environment to store the food in a chilled state. Selected foods on the trays are rethermalized in the cart, i.e., heated to a hot serving temperature. The rethermalization method is usually directed to conductively applying heat to the selected food portions through a heating plate which is heated by a thermostatically controlled electrical heater. Examples of those systems are described in U.S. Pat. Nos. 4,068,115; 4,235,282; 4,584,466 and 5,285,051. The trays are intended to be served to the consumer as such and therefore are not adapted to heat large size portions of food but only individually portioned food in dish.

U.S. Pat. No. 3,608,627 relates to a combination refrigeration and cooking device. A plurality of casseroles are provided into a freezing or chilling chamber. Each casserole has an electric heating element associated therewith which is connected to an electric circuit controlled by suitable switching and/or timing means. Each casserole has a cover and an associated heating element which form a complete thermally insulated unit. The thermally insulated unit reduces the heat loss of internally produced heat so that there is no significant loss of heat to thermally affect adjacent casseroles that may be retained in a frozen or chilled state. Such a device is not adapted to heat packaged food such as standardized "pans" size of food. Furthermore, the heating casseroles need to be regularly removed for cleaning and/or washing which may lead to potential safety issues since the casseroles also include electrical means.

U.S. Pat. No. 5,445,062 relates to a cooker/rethermalizer especially suited for cooking or reheating of prepared, packaged meat and sauce entree items or vegetables comprising a food vessel retaining an aqueous bath, a food locator rack for supporting packaged food items and fluid outlets provided in the rack to cause fluid to exit into the bath and agitate the bath over and past food items. Such a heating apparatus is suited to accommodate flexible film packages, so called "sous vide" packages. However, the system is relatively cumbersome and requires a relatively long preheating time for the bath to be operational.

U.S. Pat. No. 5,948,301 relates to a food thermalization device which permits the food to be rethermalized and held warm which includes an electrically-resistance heated plate which is controlled to equilibrate at a set temperature in the range of 160° F. to 185° F., with a fluctuation not exceeding plus or minus 5° F.

U.S. Pat. No. 5,069,920 relates to a method of electric conduction cooking of food in a package. The package includes two electrodes including a raised portion of the bottom wall and a planar top electrode and wherein the recessed area between the raised portion of the bottom wall and the sidewall of the package defines a peripheral reservoir. The food is cooked by passing electrical current through the food and allowing the drainage and accumulation of exuded products from the food product being cooked so as to prevent contamination of the bottom electrode. However, the heating greatly depends upon the electrical conductivity of the food individual pieces contained in the package. As the electrical conductivity of the food product may also differ from frozen state to thawed state, and as a function of temperature, the heating pattern is difficult to control accurately. Furthermore, shock hazards are greatly increased when current is passed through the food itself whatever efforts are made to diminish the risks.

U.S. Pat. No. 4,102,256 relates to a cooking apparatus for use in conjunction with food which is held in a container whereby, thin-walled flexible members defining the cooking surfaces are thermally coupled to heating means maintained in position against the thin-walled flexible members by maintaining means including resilient means.

Therefore, there is a need for heating, and possibly holding hot, packaged food in relatively smaller, simpler, safer and more convenient ways using relatively low power requirements as compared to existing foodservice or even household ranges. There is also a need for efficiently and evenly heating food packaged in the standard container, in particular, aluminum lidded tray, or other differing packaging without the requirement of removing the food from the container to facilitate heating of the food to deliver the intended temperature and quality. There is also a need for controlling the heating of the food so as to optimize the heating time and reduce the risk of over heating and burnt food surfaces.

SUMMARY OF THE INVENTION

The present invention relates to a heating assembly for rapidly and evenly heating packaged food adapted to receive a food container having a plurality of surfaces demarcating a volume for the food, wherein, the assembly comprises at least a first heating tray part and a second heating tray part; both first and second heating tray parts being arranged to define a substantially closed heating housing. The housing includes heating surfaces associated to resistive elements wherein the housing is arranged to receive the food container so that the food container substantially matches the internal shape of the heating housing upon closing of the heating device and so that the container is substantially in contact with heating surfaces of the housing for direct heat conduction from the heating surfaces.

Preferably, the housing comprises internal heating surfaces that are adapted in number and shape to substantially contact all the surfaces of the container. Therefore, the container serves the purpose of conducting the heat to the food contained in the container. The container may be a closed or open container. If the container is an open container, heating surfaces may be provided for heating the food surface by convection, radiation and/or conduction. Preferably, the heating surface is as close as possible to the food surface. As a result, the food receives heat from all directions and directly with a minimum of thermal losses. The heating time can be successfully shortened for all size of food packages.

In a preferred arrangement, each internal resistive heating surface of the housing is formed of at least one resistive heating layer. The heating layer is adapted to substantially match the shape of the container and therefore provide efficient direct conduction heating to the container, thereby minimizing thermal losses. The heating layer is preferably a supporting non-moveable layer that is sized and shaped to preferably one or a limited number of configurations of container. As non-moveable, it is meant that the heating layer is positioned in place so that upon closing of the device, the heating layer comes into contact with the surfaces of the container without requiring self-adjustment to the shape and size of the container. It has been found that a better and more uniform heat transfer is carried out when the heating layer precisely fits the container's shape without significant mobility. In particular, as the configuration of the heating layer is adapted to precisely conform to a relatively limited choice of container(s), there is a reduced risk to create non-contact or low pressure contact areas which could be the result of insufficient or slower heating zones. The contact pressure between the container and the heating surface can also be more precisely controlled and remains substantially the same from one package to another. Furthermore, the heating device being allowed to receive a limited choice of container(s), one can more surely guarantee quality and fast reheating with heating surfaces having heating properties specifically adapted to the container(s). As for instance, depending on the container's size and shape, the heating pattern of the heating layer might require important changes which can only be properly carried out by changing the heating layer, as a whole, and replacing it by a heating layer having the required properties. In an embodiment, the heating layers are inserts made removable from the rest of the heating assembly so that they can be replaced by inserts defining smaller or greater volumes of the heating enclosure. The inserts may be attached in the assembly by any suitable non-permanent connection means. Hence, the heating assembly can easily and conveniently accommodate more than one size and/or shape of containers by simply and quickly changing the inserts to precisely fit the new size and/or shape of the containers.

Importantly, the heating layer includes at least one heating resistive element that uses electrical energy converted into heat based on the resistivity of the material that the electricity is flowing through. Therefore, the heating layer contacting the food container is not made separate from the resistive element(s) but is integral part of it or securely attached to it, thereby promoting direct heat transfer and providing a faster heating process. The fact to provide heating layers including resistive elements layers adapted to the size and shape of the container without significant mobility improves the heating efficiency, optimizes heating time and reduces the complexity of the device as compared to the existing heating devices.

In usual existing heating methods of food in large containers such as convection heating, the amount of heat applied is approximately equal on all exterior surfaces. However, at corners and edges, the food typically receives more heat by surface unit as heat comes from 2 or 3 directions, thus resulting in a much higher food temperatures than developed at the exterior surfaces away from those edges and corners. As a result, overburning may occur when attempting to heat the center of the food hot in a reasonable amount of time. According to the invention, the amount of heat may accurately be varied to different regions of the food by providing heating surfaces of the housing having zones of lower power density and zones of comparatively higher power density. Since those zones are directly conducting the heat to the container, the heat pattern can be much more accurately controlled and, therefore, areas of the packaged food which are prone to overheating and burning; e.g., such as corners or edges, may advantageously receive less amount of heat than zones of higher food thickness(es). Preferably, the edges and corners of the heating surfaces contacting the container form zones having no heating elements or, alternatively, may be merely insulated zones of contact. Corners and edges defined here mean the areas of the internal surfaces of the housing within approximately 15 mm, preferably 10 mm from exterior places, whereby angles are formed between two or three planes that meet in a line or a point.

In a first embodiment, the heating layer may preferably comprise a highly thermally conductive solid matrix that includes strategically placed resistive elements placed throughout the solid matrix. The electrically resistive elements may be contiguously fixed to, embedded and/or sandwiched in the solid material matrix.

In an embodiment, the resistive heating layers may be made from bendable, shapeable or moldable materials so that three dimensional layers may be obtained which can closely conform to the shapes and dimensions of the food container to be heated. In this way, such shapeable or moldable heating layers can take on any necessary shape and geometry for the intended purpose. Suitable shapeable or moldable materials are preferably metallic materials, heat resistant reinforced or non-reinforced polymer resins or rubber materials and combinations thereof that can be molded in a mold or shaped to a defined shape adapted to match the surfaces of the container by any suitable casting, molding, injection-molding, stamping, die forming or any other suitable technology.

More preferably, the resistive heating surfaces may provide an average resistive power density at the heating surfaces at a full power mode of at least 0.45 Watts per square centimeter, preferably of at least 0.70 Watts per square centimeter, even preferably of about 0.80 Watts per square centimeter but, preferably, with absence of localized area producing more than 1.5 Watts per square centimeter, preferably more than 1.2 Watts per square centimeter, even more preferably 1.0 Watts per square centimeter.

In order to properly heat the food material in the shortest possible time, yet not to negatively effect the food quality, the temperature of the heating surfaces should preferably be controlled. This can be carried out by using at least one temperature-measuring device. The heating device assembly would also include a controlling device to control the surface temperature as measured by the temperature measuring device. The controlling device is arranged to receive an input from the temperature measuring means and controlling the temperature of the heating surface(s) when the input reaches a predetermined temperature set point. The controlling device may carry out temperature control by any number of means such as controlling the voltage, time proportioning the electrical power or controlling the amplitude of the alternating current going to one or more of the resistive surface(s). More specifically, when heating the frozen food product in a large container by proportional control, the frozen food product will act as an ideal heat sink not allowing the heating surfaces to reach full temperature at fall power, i.e., of at least 0.45 Watts per square centimeter, preferably of about 0.80 Watts per square centimeter. As the product heats, the surface temperature set point will be reached causing the controller to adjust the power density from full power. As heating of the product continues, the product becomes less and less of a heat sink, further causing the controller to reduce power to where at the end of heating, power density may be less than 0.2 Watts per square centimeter, preferably of less than 0.15 Watts per square centimeter. Therefore, the controlling device allows to adequately control the heating curve of the food product while preventing overburning and drying out of the food by progressively lowering the heating power of the heating surfaces from a full power mode to a reduced power mode as the food product progressively loose its ability to act as a heat sink.

The controlling assembly may preferably control the temperature of the heating surfaces by profile control whereby the temperature of the heating surfaces sensed by the temperature measuring device is compared at regular time interval to a preset temperature profile stored in a control memory of the controlling assembly. The profile-based control significantly reduces the heating time and, provides a good product quality with no generation of burnt food surfaces and overheating problems.

The controlling device may also serve to establish different modes, more specifically, a heating mode wherein the packaged food is heated to a temperature of from 50 to 80° C.; e.g. about 71° C., and a holding mode wherein the packaged food is held hot to a service temperature of from 60 to 65° C. during which the food product becomes available for serving.

The control based on a comparison with a stored profile may also serve to establish a more easy turn from a heating mode whereby the heating surfaces are controlled at a higher temperature range, within a predetermined profile, to a holding mode whereby the heating surfaces are controlled to a substantially constant temperature, e.g., 80° C., necessary for keeping the food product at the required serving temperature, e.g., 45–55° C. In the holding mode, the top heating surface may preferably be switched off and the bottom heating surface still producing heat transfer to the container. As a result, the top assembly may be kept open to allow a convenient serving from the consumer.

Advantageously, the first heating tray part is a recipient part for the container which comprises a first concave shaped resistive heating surface for receiving the food container in position within the heating device and the second tray part is a closing plate-shaped member having a resistive heating surface, wherein the second tray part is adapted to move relative to the recipient tray part from an opening position wherein the heating device is in an opening configuration and a heating position wherein the housing is securely closed. In this way the device provides a convenient loading of the container therein.

The food container and the heating tray parts may also have complementary discrete portion(s) of relief adapted to position the food container in a limited number of positions within the heating housing of the heating device. Discrete portion(s) of relief may include complementary shaped recess(es) and protruding portion(s) and/or complementary shaped corrugated portion(s) which fit one another to provide an increase of the contact surface and/or reduction of the distance for heat to travel in the food to promote direct thermal conduction transfer and reduce heating times. In this way also the container that is not complementary shaped to the housing with those discrete portions adequately fitting together cannot be loaded and consequently heated, thereby limiting the risks for possibly damaging the device and/or imperfectly heating the packaged food.

Preferably, the number of positions the food container complementary fits the housing is lower than 4, preferably lower than 2 or less. This allows restricted positioning of the container in the housing, thereby ensuring the direct conduction transfer from surface to surface can be carried out properly and efficiently.

Also preferably, the heating assembly comprises a heating housing forming an overall heating volume of between 200 to 6000 cm$^3$, more preferably of 300 to 3000 cm$^3$ therefore adapted to receive single serve packaged meals or large multi-serve containers of corresponding volumes. The cavity may be formed of a single cavity adapted to receive a single food container or, alternatively, it may also be formed of multi-compartments of separate volumes smaller than the overall volume of the housing to allow heating of more than one container at a time.

The invention also relates to a method for rapidly heating a food within a container comprising:

providing a food container having a plurality of surfaces demarcating a volume for the food;

providing an electrical heating device comprising a closed heating housing; the housing comprising internal heating surfaces associated to resistive heating elements;

positioning the food container in the housing which is arranged to receive the food container so that the food container substantially matches the internal shape of the heating housing upon closing of the heating device and so that the container is in contact with the internal heating surfaces of the housing for direct heat conduction to the container; and, applying electrical current to said heat resistive elements.

The invention also relates to a method for rapidly heating a food product which is in a multi-serving container, the method comprising placing the container with the food product into a heating cavity sized to receive the container, and directly applying thermal energy to the food product through conduction between the heating cavity and the container. Preferably, thermal energy is applied to the food product container by the use of heating layers that demarcate a heating cavity of substantially fixed size and shape to fit the size and shape of the container. Even more preferably, the heating layers are interchangeable so that the volume and/or shape of the heating cavity can be modified by interchangeability of the inserts to adjust to food containers of varying size and/or shape.

In another aspect, the invention also relates to a method for reducing space required in food outlets to heat and keep warm food products in a multi-serving container of a selected size, the method comprising heating each food product in a heating cavity through conduction between the heating cavity and the container, the heating cavity being close-fitting sized to receive the container containing the food product.

In still another aspect, the invention relates to a method for vending food products in food outlets, the method comprising:

providing a heating cavity having heating surfaces;

placing a container including the food product into the heating cavity, the container engaging at least a first and second surfaces of the thermal conductive heating surfaces;

resistively energizing the heating surfaces for heating the food product through conduction of thermal energy to produce a heated food product; and opening the container and serving the heated food product.

Preferably, the heated food product is heated from a frozen state to a hot/warm state suitable for serving. Preferably, heating of the food product is controlled by controlling the temperature of the heating surfaces. Preferably, heating is carried out by controlling a decrease of the temperature of the heating surfaces. Preferably, heating of the heating surfaces is controlled by a profile control wherein the temperature of the heating surfaces sensed by sensors is compared at regular time interval to a preset temperature profile stored in a control memory and the power delivered to the heating surfaces is proportional to the differential between the set point and the sensor signal. Preferably, the food product is held in the heating cavity to keep it warm by controlling the reduction of power of the heating surfaces.

In an embodiment, holding of the food may be achieved by thermally disengaging one of said first or second surfaces with the container while maintaining the other surface in conductive heating with the container and further keeping the container opened and available for serving.

BRIEF DESCRIPTION OF THE DRAWINGS

The accompanying drawings, which are incorporated in and form a part of the specifications, illustrate the preferred embodiments of the present invention, and together with the description serve to explain the principles of the invention. In the drawings:

FIG. 1 shows a perspective view of the heating device of the invention in a closed configuration according to a preferred mode;

FIG. 2 shows a side view of the heating device of FIG. 1;

FIG. 12 shows a graph of the heating curves in the device of the invention for a half-pan lasagna aluminum container.

DETAILED DESCRIPTION OF THE PREFERRED EMBODIMENTS

Figure 3:
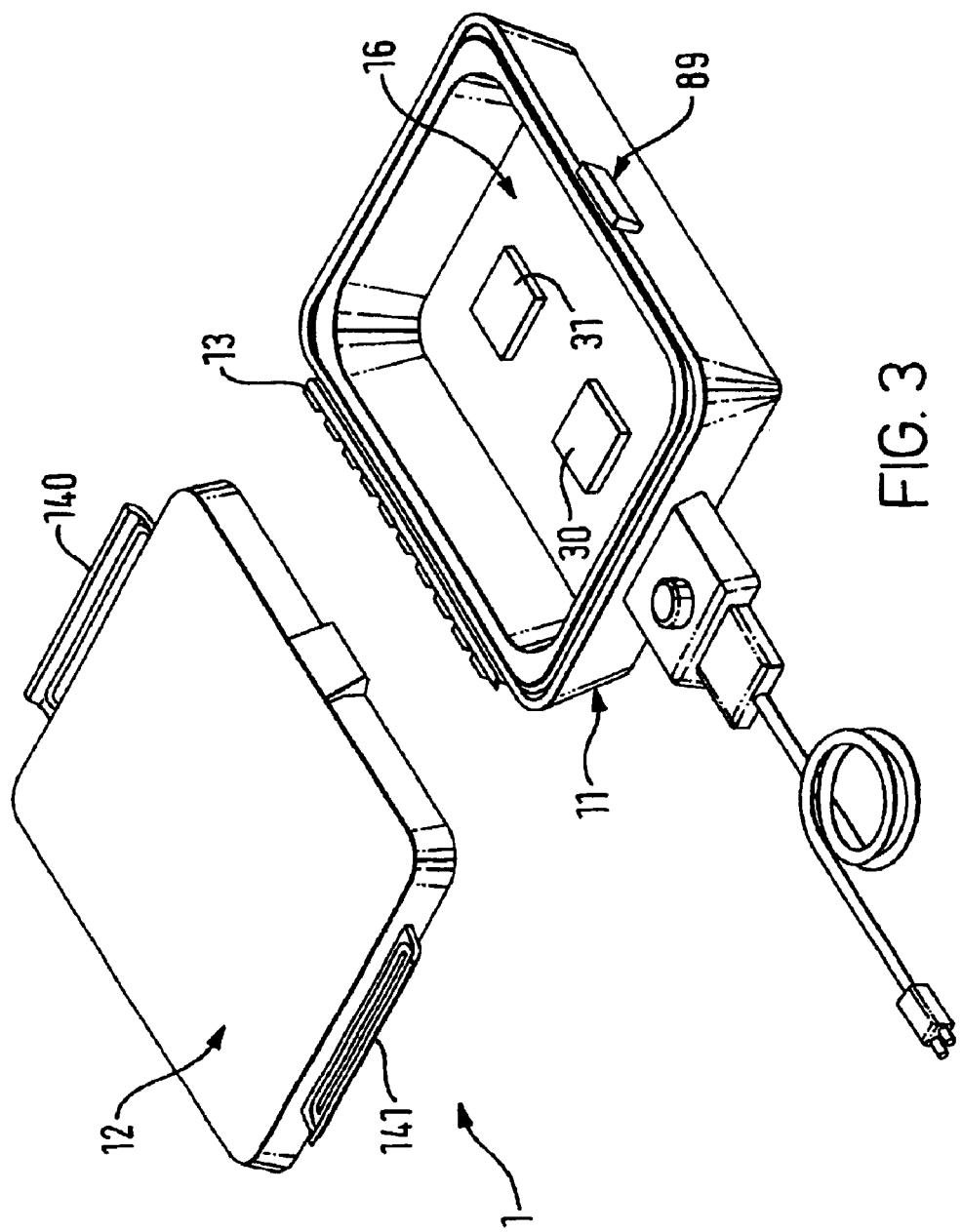
FIG. 3 shows a perspective view of the heating device of the invention with the upper tray part removed.

Referring to FIGS. 1 to 5, there is illustrated a heating device 1 of the present invention for receiving packaged food therein. First of all, the heating device of the invention draws its electrical power from electrical power commonly supplied to homes, offices, restaurant, delis, catering, C-stores, offices, hospitals, QSRs, cafeterias, full-serve restaurants or other foodservice facilities or places where kitchens do not exist such as dormitory, kiosks, stadiums, concessions, assisted living, mobile catering, food trucks to work sites, schools, homes and office lounges, etc. The heating device is capable of transforming the electrical energy into an amount of heat using resistive elements of the heating device. The available amount of heat provides a rapid and efficient thermal transfer to a packaged food by arrangement of a specific surrounding of electrical resistive elements coupled to heating surfaces that tightly fit to the surfaces of the packaged food. The amount of heat is specifically distributed by the heating surfaces and controlled to uniformly heat the packaged food and significantly reduce the heating time. The device is intended for heating food in a rigid container or a flexible container. The container may be a closed container or an open container that supports the food in a defined volume.

The electrical heating device 1 comprises a heating body 10 to which is connected a control assembly 6 and electrical connecting means 7 for the power supply of the device. The heating body has a first bottom tray part 11 and a second top tray part 12 which are coupled together by a hinge means 13 or any suitable coupling means which allows the two tray parts to be easily movable relative one to the other between a closed position to an open position and vice versa. The hinge means is even preferably made removable so as to offer the possibility to remove the upper tray part entirely. For safety reason, the top tray part 12 may preferably be locked in closed position on the bottom tray part by means of locking assembly 89 which may be positioned opposite the hinge means. Such locking assembly may also contribute to improve the contact between the packaged food and the resistive heating surfaces by maintaining a slight pressure between the various surfaces in contact. The heating device may easily be made transportable by providing handles 140, 141 attached to two opposite sides of the bottom tray part.

Figure 4:
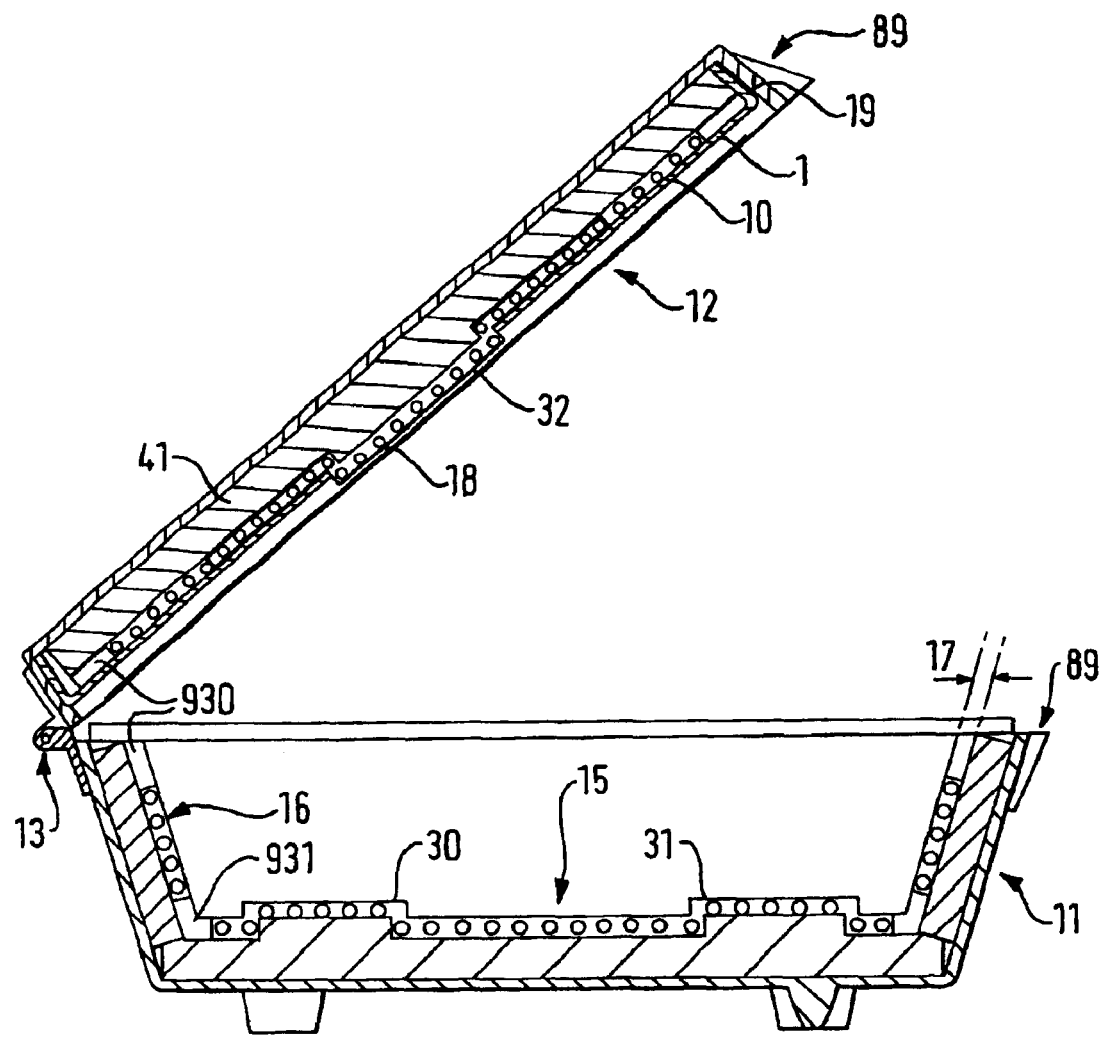
FIG. 4 shows a cross sectional view of the heating device of FIG. 1 along lines A—A in an open configuration.
Figure 5:
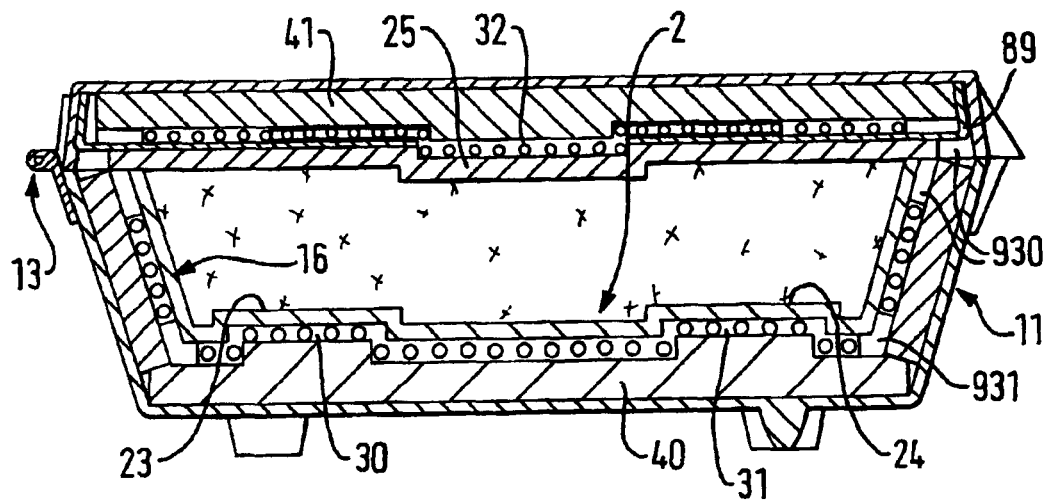
FIG. 5 shows a cross sectional view of the heating device of FIG. 1 along lines A—A in a closed configuration and with a food container inside.

As illustrated by FIGS. 3, 4 and 5, the bottom tray part 11 has a general concave shape forming a recipient heating tray part for a complementary shaped food container 2. The top tray part 12 is preferably a closing plate-shaped member, which cooperates in closure with the recipient tray part 11 to define an internal heating housing 15 in a heating mode of the device. The housing 15 is delimited internally by resistive heating surfaces. More specifically, a first concave shaped resistive surface 16 is formed from a first heating layer 17 of the bottom tray part. Similarly, a second upper resistive surface 18 is formed from a second heating layer 19 of the top tray part.

Both layers 17, 18 comprise a solid matrix including electrically resistive heating elements. The solid matrix may be of any suitable material which can repeatedly withstand temperatures within a range of 130–150° C. or higher during an extensive period of time. As solid matrix it is meant any sort of layer or laminate(s) of supporting material to which are secured resistive heating elements. The resistive elements may be sandwiched between two sheets of the matrix or embedded within the matrix or even simply attached contiguously to the solid matrix while the solid matrix forms the heating surface of the layer. It is important that the resistive heating elements directly contact the heating surfaces of the solid matrix with no gap or non-contacting zones between them and the heating surfaces to avoid energy dissipation and ensure uniformity of heating.

The heating elements may be wire(s), fibers, mat(s), woven or unwoven fabric(s), grid(s), etched foil(s), tubular heaters(s) or any other suitable resistive element. The elements may be formed in a variety of shapes such as continuous or discontinuous strands, strip(s), tube(s), patch (es), or any other suitable shape. The resistive elements may preferably be fabricated of electrical resistance material, in particular, nickel-chrome, nickel-chrome iron, nickel-copper, nickel-iron, carbon or any other material that is commonly known and available that has enough resistance to the flow of electricity to produce substantial heat and high enough melting temperature to withstand heat when electricity is applied and that conducts heat at fast enough rate to the heating surface in direct contact with the food package.

The heating surfaces of the solid matrix may comprise a highly thermal conductive metal, a heat resistant polymer, a fiber reinforced polymer, a rubber and combination thereof Metallic surfaces are preferred for repeated heating cycles. The metal may preferably be chosen among the group consisting of aluminum, steel, stainless steel, copper, nickel-chromium, iron-nickel-chromium and their alloys. The resistive elements should preferably be positioned within the solid matrix at a distance relatively close to the heating surface.

In a preferred embodiment, the resistive heating elements are etched foil elements. Those elements are created by acid etching a circuit in metal resistance alloy foil; e.g., nickel alloy foil, and supported by the solid matrix; e.g., silicone rubber, KAPTON® (manufactured and sold by E.I. du Pont de Nemours & Company) and mica-insulated, high temperature foil.

In another embodiment, the resistive heating elements may be tubular heaters known as helically coiled resistor wires that are contained in compacted magnesium oxide or other ceramic type materials to provide electrical insulation and further covered by a metallic sheath as protection. Preferably, the metallic sheath is chosen among the group consisting of copper, steel, stainless steel, nickel-chromium alloy, iron-nickel-chromium alloy and any alloys, blends and combinations of those metals. A suitable highly heat resistant and thermally conductive alloy is INCOLOY®, an iron-nickel-chromium alloy manufactured and sold by INCO company. The tubular heaters may be bent to any suitable shapes and applied to or in a thermally conductive matrix; e.g., cast aluminum alloy. Suitable tubular heater are manufactured and sold by Chromalox, Chicago, Ill.

In another alternative, the resistive heating elements may be thick film resistive heating elements. The formation of thick film elements is well known in the art. Usually, a thick film element comprises a thick conductive track applied to an oxidized metal substrate. A dielectric layer is adhered to the metal substrate such as a glaze. A thick film circuit layout is then applied by silk-screen printing in which a conductive track constituting the heating element is printed. The technique consists in depositing an ink, consisting of a solvent and a mixture of metal and/or metal oxides. The metal or metal oxide may be chosen among the group of palladium, copper, nickel, platinum, silver or even carbon may be used. The track terminates by welded electrical contact portions to make possible the connection to the electrical control assembly. Several thick film elements may be placed in a contiguous manner to obtain a three-dimensional heating surface of the bottom tray part. Those elements may be connected mechanically and/or electrically connected together or run separately as independent resistive circuits.

Preferably, the heating layers may be constituted of bendable, moldable or shapeable materials to better conform to the packaging shape and as one single layer may serve for producing internally each tray part. As bendable, shapeable or moldable, it is meant a material that can be formed to a three dimensional shape using any suitable technology such as molding, casting, injection-molding, die stamping or press forming or any other methods. In an alternative, several separate layers may be provided to make the heating surface for each tray part, as well, while the pattern of resistive elements may be either common or alternatively specific to each layer. The heating surfaces are preferably thin so that the resistive elements; e.g., the wires or resistive tracks, are positioned as close as possible to the food container 2 to be heated and the solid matrix is preferably of heat conducting material, preferably metal, to conduct heat from the resistive elements orthogonally inward to the container's surfaces. The thickness of the heating surfaces is also dependent upon the section of the resistive elements; e.g., the wire diameter, However, the thickness of the heating surfaces should usually not exceed 8 mm, preferably less than 5 mm, even preferably less than 2 mm. As a matter of preference, the heating layer may achieve thicknesses of about 1.2–1.5 mm with wire-wound element(s) and of about 1 to 1.5 mm with etched foil element(s).

Figure 6:
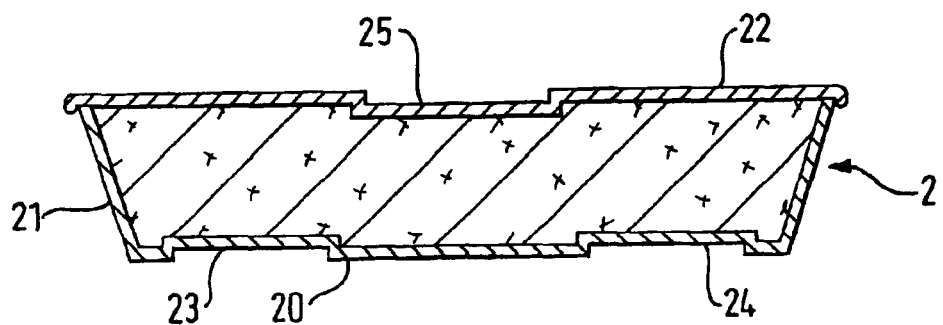
FIG. 6 shows a cross section of a food container according to a preferred mode of the invention.

As shown in FIG. 6, the food container may be a standard lidded aluminum tray comprising a bottom supporting surface 20, a continuous sidewall surface 21, and a lid surface 22 used for closing the container. The general shape of the container is not limiting. It may have any kind of plan section such as rectangular, square, oval or round. In the present case, the food container has a four sided surface 21 forming a rectangular "half pan" container commonly found in foodservice area to store large size frozen entrees such as fish, meat, vegetables, gratin, lasagna, or combinations, etc. Preferably, the heating method of the invention is capable of significantly reducing the heating time for large food containers used in foodservice; i.e., of between 1800 to 6000 $cm^3$, even preferably of between 2000 to 3000 $cm^3$. As a matter of example, typical half-pan aluminum trays in the United States have typical dimensions of about 31 by 25 cm, and have varying depths, typically of between 3.3 to 5.7 cm deep. The container could also be made of other materials such as PET, paperboard or reinforced plastic or composite materials. The container may also be a flexible container such as a heat resistant plastic pouch. The pouch may be of a volume preferably equal or slightly lower than the volume of the cavity so that the pouch may closely fit in the heating cavity of the device while all the surfaces of the pouch substantially contact the heating surfaces of the cavity. If the pouch contains frozen food, the pouch should have a frost outer shape that substantially matches the shape of the cavity.

Importantly, the heating surfaces 16, 18 of the heating device must be shaped and dimensioned so that they match as closely as possible the surfaces 20, 21 and 22 of the food container. Shape matching discrepancies between the container and the heating surfaces should be avoided as much as possible. In particular, non-contact areas may create dead air spaces and warm to higher temperature, as there is little to sink the heat away as compared to contact areas where the packaged food plays the role of heat sink. Therefore, substantially all the available heating areas of the food container should preferably be in direct contact with the receiving heating surfaces of the heating device. In an embodiment, the heating device may heat the food container with the lid 22 of the container being removed. In that configuration, the top heating surface 18 may contact the food surface to heat the food by direct conduction or alternatively may be distant to the food surface to heat the food by a combined effect of convection and radiation. In an embodiment, the top surface may only partially contact the food as the surface of the food may usually be irregular. In any case, the top surface should preferably be as close as possible to the food surface. Preferably, it should be placed at less than 10 mm, preferably less than 0.6 mm and even more preferably less than 0.5 mm.

The heating device and the container may both include small discrete venting zones to allow gas and vapor generated during heating to evacuate outside the device. Such zones could be narrow tubes, apertures or holes provided within the heating layers of the device and/or along the edges of the heating layers. Such zones should no exceed more than 5%, preferably 3%, of the total surface of the heating surfaces so as to be not detrimental to the heating output and heating time.

According to one advantageous aspect of the invention, the heating surfaces may have zones of lower resistive power density (wattage per surface unit) and zones of comparatively higher resistive power density to give the opportunity to adjust the heating pattern to specific heating specification depending upon various factors such as the type of food, geometry and thickness of the container. For instance, large planar heating areas should be more resistively dense as compared to angular zones such as corners or edges where the food product would have normally a tendency to be heated from 2 or 3 directions thereby creating undesirable overburning areas. For example, FIGS. 4 and 5 show non-heated areas of the peripheral edges 930 of the heating layers 17, 18 and of the bottom corner edge 931 of the bottom layer 17. The non-heated areas may be insulation pads made of silicone rubber or similar or alternatively, be non-wired parts of the solid matrix itself.

In one embodiment, the top heating surface may have a higher resistive density than the bottom heating surface to form a vertical temperature gradient and thus favor a grilling effect on the top of the container while reducing attachment in the bottom. The temperature gradient and consequently the resistive power density between the bottom and top may also be the other way around if the top surface of the food product needs to be less cooked as compared to the center part of the product. For food containers having a vertically oriented dimension (i.e., or thickness) lower than its horizontally oriented dimension (i.e., or width), the resistive power density applied orthogonally to the vertically oriented dimension may preferably be lower than the resistive power density applied orthogonally to the horizontally oriented dimension. In other words, for food containers as illustrated in FIG. 6 which have relatively small sidewall surfaces as compared to its bottom and top surfaces, the resistive power density applied to the sidewall surfaces should preferably be between 2 to 6 times lower than the resistive density applied to the top or bottom surfaces. In a possibility, the sides of the concave surface 23 can be free of resistive heating elements when the thickness of the housing is relatively small as compared to the upper and bottom heating surfaces. In that particular case, it is desired that the sides of the housing remain substantially in contact with the sidewalls of the container to avoid creating air gaps.

The resistive power density may be adjusted by various means. The easiest solution consists in varying the power density of the wired layers or, similarly, of the track density of the thick films whichever resistive elements are concerned. As a matter of example, the spacing between two wire portions by loop may be reduced to increase the wire density (length of wire per unit surface) and consequently increase the resistance of the unit as the resistance is a function of L/S (L is the length of the wire and S is its section). Similarly, the conductive track of the thick film element may be varied the same way (length of track per surface unit). The section of the wires or width of the track may also be varied as the resistance is inversely reduced by increasing the section or width. Another possibility for varying the resistive power density may be to vary the voltage which is sent to the resistive circuits using the formula $R=V^2/P$. Variation of the voltage may be obtained by providing a voltage transformer which is commanded by the controlling assembly. The voltage may usually be transformed from any value between 100 and 480V. Yet another possibility for varying the power density may be to vary the average power applied by time proportioning the power or by any other suitable means. This can advantageously be done by more sophisticated electronic control assemblies 6 to control different heating zones of the heating surfaces 16, 18.

The conductive power required for heating large size food containers according to the heating device of the invention has been estimated to be of an average of between 500 to 1500 Watts at the start of the heating cycle. More specifically, the resistive heating surfaces should be capable of producing an average power density of at least 0.45 Watts per square centimeter. As an example, the resistive power density of the side heating surfaces may preferably be of between 0.08 to 0.23 Watts per square centimeter and the resistive power density of the top or bottom may preferably be of from 0.45 to 0.80 Watts per square centimeter.

Preferably, both the food container and the tray parts may comprise discrete portions of relief which complement together to ensure positioning of the food container within the heating housing according to a limited number of possible positions. As an example, the bottom surface of the container may include several recess portions 23, 24 which closely fit complementary shaped protruding portions 30, 31 of the heating surface of the bottom tray part. Similarly, the lid surface 22 of the food container may comprise a centrally positioned recess portion 25 which complementary fits a centrally positioned protruding portion 32 of the upper heating surface 18 of the top tray part. The relief portions may be of various geometric shapes such as circular, rectangular, triangular, etc. One object of these portions is to ensure that only specifically designed food containers can properly fit the heating device so that the quality and safety can be guaranteed and malfunctions problems can be avoided. Other objectives of those portions of complementary shapes is to offer enlarged conduction surface(s) to promote the thermal transfer and/or reduce the distance needed for heat to travel, therefore reducing the heating time.

The heating layers of the two tray parts 11, 12 may advantageously be insulated from the outside by thick insulating jackets 40, 41 of thermally insulative material such as polymer foam or silicone sponge rubber or any other suitable material. The insulated jackets preferably have a lower heat conductivity than the heating layer so that they effectively inhibit the heat generated by the resistive wired layers from escaping outwardly. The thermal insulation may also comprise air insulating zones disposed as pockets or layers within the jackets. Preferably, the jackets may be molded to a three-dimensional shape so that they fit the external contour of the heating layers 17, 19. The jackets may be molded over the heating layers or alternatively be molded separately and attached to the heating layers by any suitable heat resistant connection means such by mechanical connection or adhesive connection. Silicone based jackets are preferred as they provide a high insulation ratio, withstand up to 200° C. and have good mechanical properties. In a possible embodiment, the connection means between the jackets and the heating layers could be made non-permanent so that the heating layers can quickly and easily be removed for cleaning or replacement by other heating layers of different specifications such as of different shapes and/or dimensions to accommodate different food container s or of different resistive power and/or density distribution to adjust the heating properties to other types of food and/or containers. The jackets may also comprise external stiff thermoformed or injected plastic or metallic covering caps which ensure a pleasant aesthetic appearance to the heating device while hiding the electrical connecting and wiring means (not shown).

Figure 7:
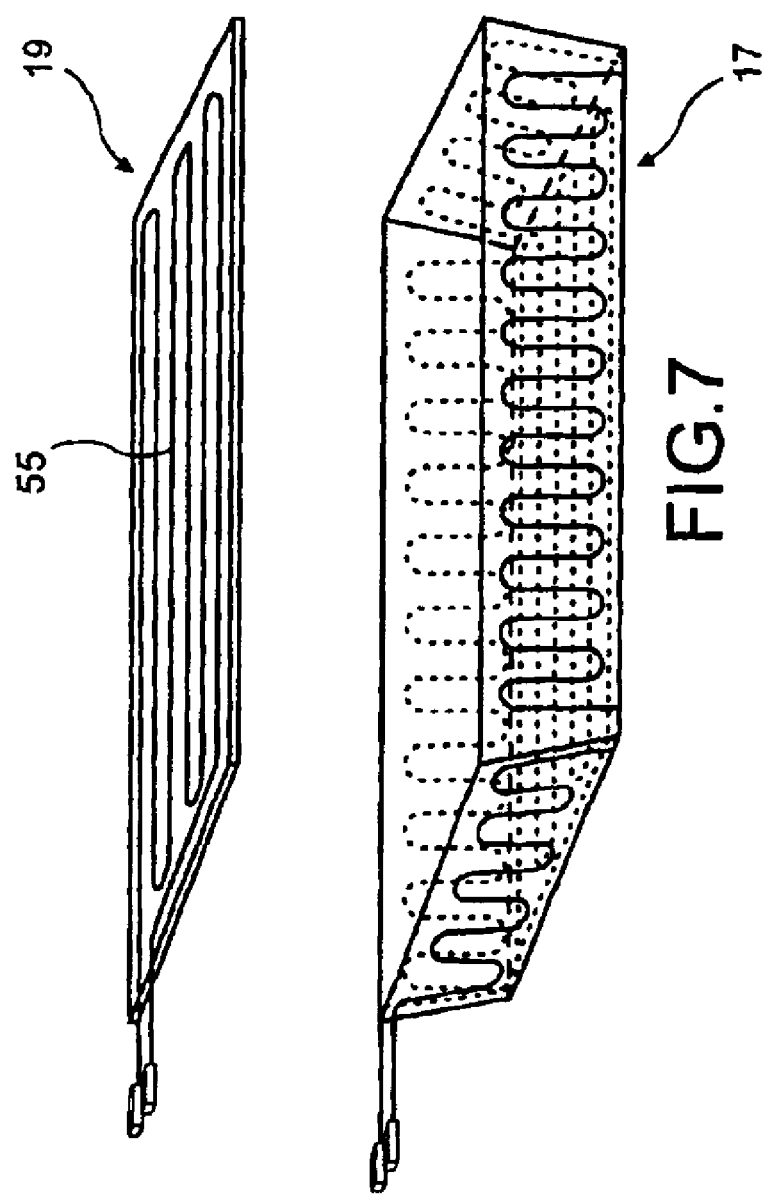
FIG. 7 illustrates a perspective view of a complete set of upper and lower resistive heating members.
Figure 8:
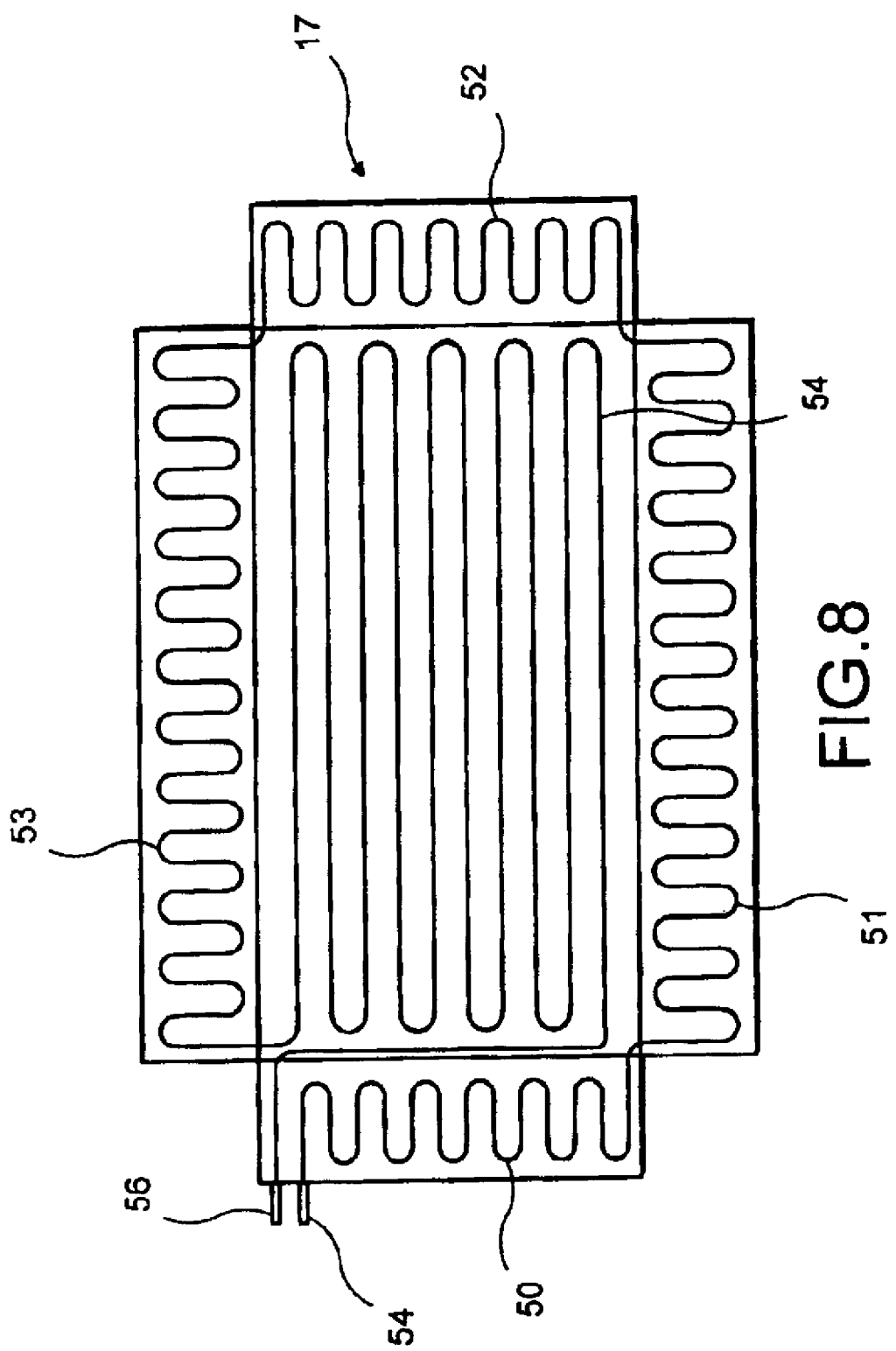
FIG. 8 shows a diagram of an exemplary pattern for the lower resistive layer.

As already mentioned, the resistive heating elements may encompass any variety of resistive patterns. FIGS. 7 and 8 illustrate a possible example. FIG. 7 shows a first lower resistive member 17 and a second upper resistive member 19 when removed from the heating device. Each member may be configured with a sinuous or serpentine wound wire pattern which substantially covers all the sides of the member. The lower member 17 having a tray-shaped configuration with five sides may advantageously be provided with an equal amount of serpentine circuits 50, 51, 52, 53, 54 mounted in series which terminate on one side of the element by two plugging means 56, 57. The upper member may have a single wire circuit 55 forming a sinuous or tortuous pattern along its whole surface and plugging means as well along one edge of the member. A local higher density resistive circuit may be treated as an independent circuit, which can be selectively activated upon needs, or alternatively be serially chained to the other circuits. The lower member 17 may be formed as a planar semi-rigid or rigid element as shown in FIG. 8, then, properly folded up and assembled into a three dimensional element as shown in FIG. 7. In an alternative, the upper and lower members 17 can be plastic molded in their final shapes using a mold with the wound wires embedded in the plastic material.

Figure 9:
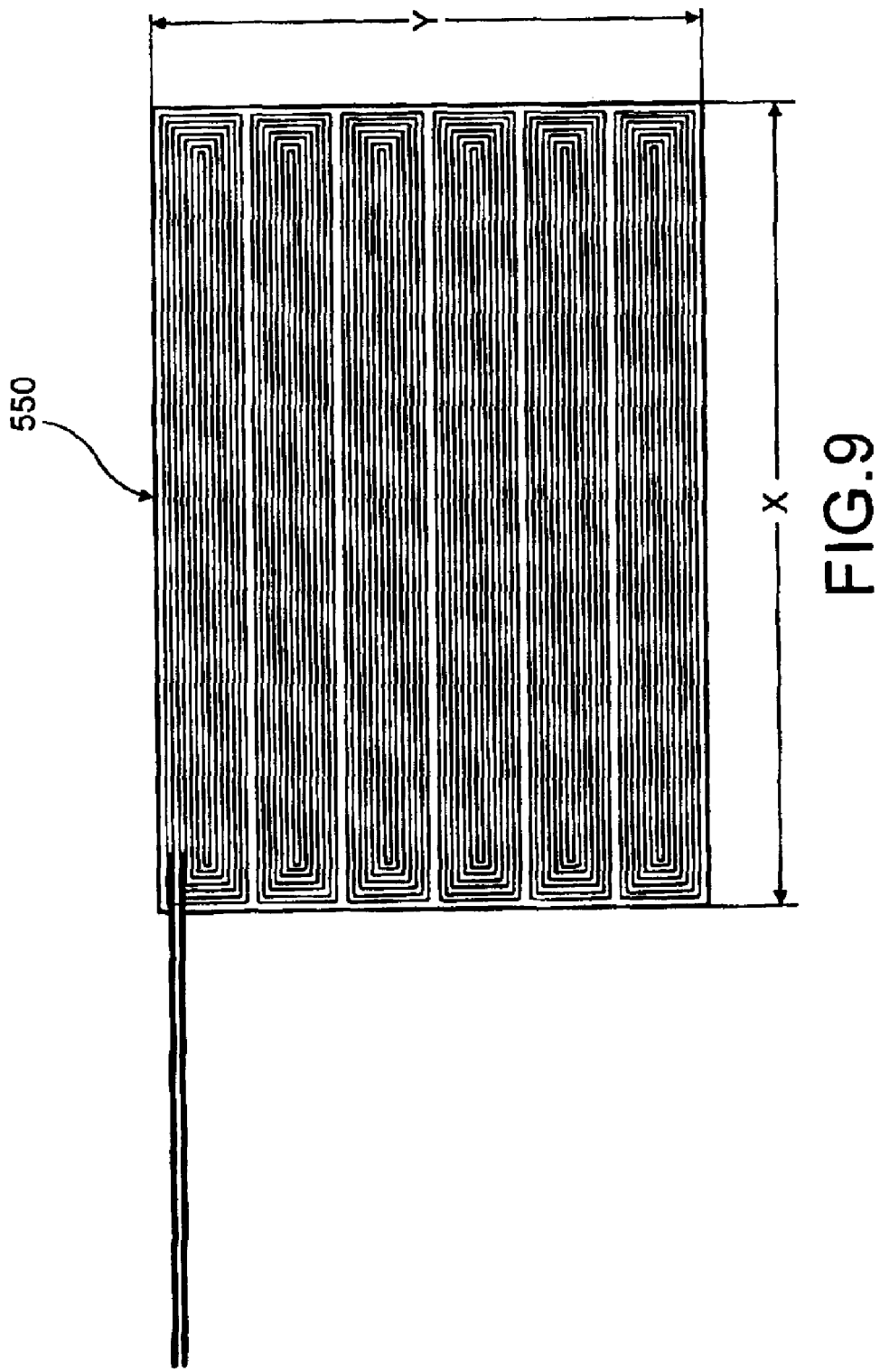
FIG. 9 is an embodiment of an upper resistive heating layer according to a variant.

FIG. 9 illustrates, as an example, an embodiment in which the resistive heating member(s) may comprise etched foil elements. The etched foil element provides excellent circuit pattern and repeatability, high heat transfer which results from greater coverage of the element. Multiple zoning can also be provided in a flexible way by varying the circuit density.

Figure 10:
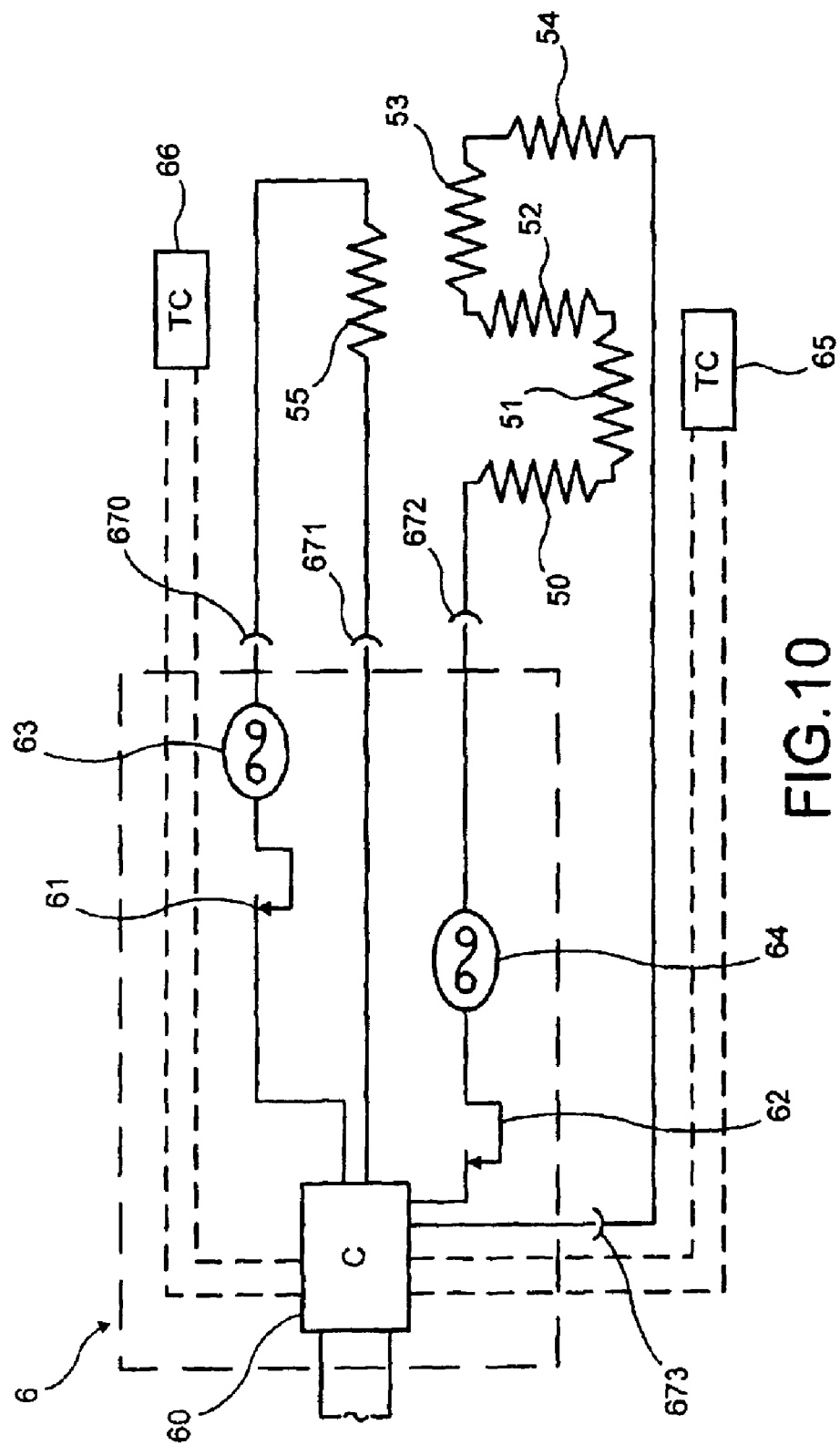
FIG. 10 shows a schematic diagram of the electric circuitry of the heating device according to a preferred mode.

Referring to FIG. 10, the electrical circuit of the heating device may be configured to provide a first resistive circuit comprising resistive element 55 and a second resistive circuit comprising serially chained resistive elements 50 to 54; both circuits having a removable connection to a main controller 60 by detachable electrical connections 67. Independent thermostats 61, 62 and fuses 63, 64 may also be part of the controlling assembly 6. Heat sensor means or thermocouples 65, 66 may optionally be arranged in contact with or close to the heating surfaces which communicate the temperature to the main controller which in return maintains a set point temperature to prevent any risks of damaging the heating surfaces and/or the container. The temperature-measuring device may include, but are not limited to, thermocouples, thermistors, RTDs, fiberoptics, Infrared, or any device that can provide an electronic or other type of signal that is converted into a readable temperature value. The controller may comprise a processor with a microprocessor and a memory device, optionally a timer coupled thereto so that the processor may make decisions as how to control the temperature generated by each resistive circuit according to heating schemes stored in the memory device. The stored executable instructions, when loaded and executed by the processor monitor the variations and interrelationship among the measurements received from the temperature sensors 65, 66 and predetermined conditions, e.g., the heating temperature scheme of particular food, optimum heating gradient in the food, heating/holding modes, etc. Based on the monitoring mentioned above, the stored executable instructions cause the control device to issue appropriate control signals to the resistive circuits, such as varying the voltage, closing/opening resistive circuits, etc. The number of the resistive circuits and temperature sensor devices is not limited and depends upon the degree of complexity and control required. For instance, the controlling device may also control to varying temperatures with time or a fixed temperature for the whole heating process. For instance, a first heating mode can be set up for heating the food package to a hot food temperature; i.e., to a minimum of 71° C., and a second holding mode can be set up for holding the package to a food temperature of between 50 to 71° C. In order to achieve the food temperature in the first heating mode, the heater temperature is higher at the beginning of the heating, e.g., of from 130 to 150° C., than that at the later heating stage, e.g., of from 110 to 120° C. The power of the heating elements may be regulated based on the deviations of the sensor signals.

If desired, the top tray part of the device can be removed or at least moved away the surface of the package to allow convenient serving in the holding mode. As an example, for a food lidded container such as gauge aluminum that contains 2.7 kg of food and has dimensions of 290 mm×235 mm, with varying depth, the heating assembly would have ideally at full power, approximately 800 to 1500 W or, more generally 0.45 to 0.8 Watts per square centimeter, and even more preferably 1000 to 1400 W. As the product is heated towards serving temperature, the amount of power provided would decrease towards less than 350 W or, more generally 0.30 Watts per square centimeter, as the rate of heat conducting into the food would slow as the temperature difference driving force narrowed. Average power applied over the whole heating cycle would be less than 400 W or, more generally 0.30 Watts per square centimeter.

Figure 11:
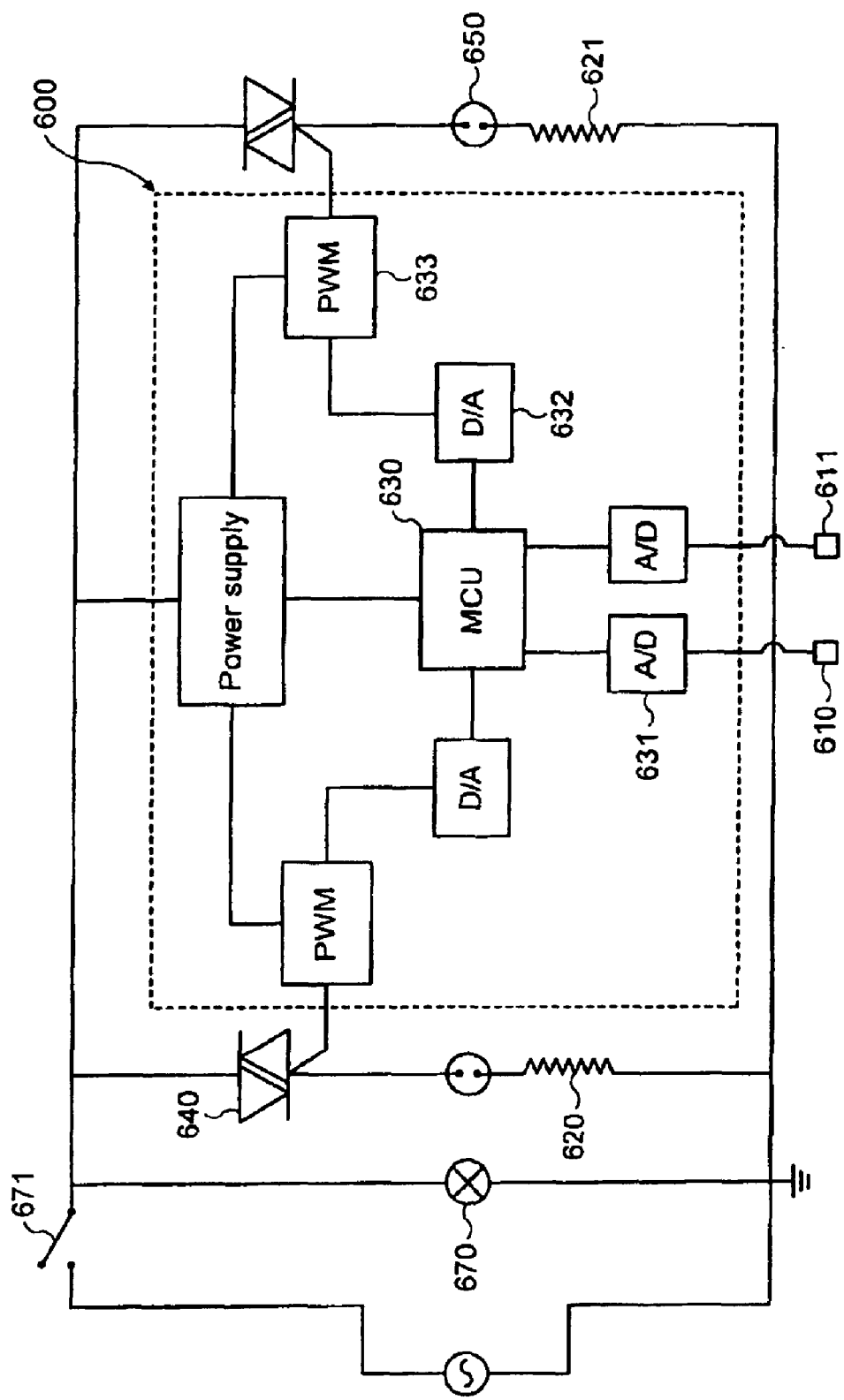
FIG. 11 is a block schematic diagram of an exemplary control system of the device of the invention.

Referring to FIG. 11, there is shown a preferred schematic block diagram of the automated control system 600 for the heating device of the invention. The temperature control is preferably based on a profile control. The temperature control point is at the heating surface of the device instead of the temperature of the food to be heated. The set point for the temperature control is preferably not a constant value but varies as a function of time. At any time interval the temperature from the sensor (thermocouple) is compared with the preset temperature at that moment, which is stored in a memory of the controller. The preset temperature diagram is product dependent and developed for a particular product and/or a particular packaging. A selection of the suitable profile may be carried out by the operator at the beginning of the heating cycle. Therefore, depending on the different types of product to be heated, there may be different preset temperature diagrams stored in the memory. The temperature of the heating surface is controlled at a preset value for a specific time interval. The stored temperature profile would normally progressively decrease as a function of time. Therefore, the higher preset temperature would normally be at the beginning of the heating time to boost thawing of the food. As the food warms up, its ability to receive higher temperatures without damage decreases. Hence, the preset temperature is lowered so as to reduce the heat of the heating surfaces and adjust the generation of heat to the capacity of the food to absorb it.

The profile control comprises temperature sensors 610, 611 configured to measure the temperature of the heating surfaces. A first sensor 610 can be installed in contact with, e.g., underneath, the heating surface of the top heater 620 and a second sensor 611 can be installed in contact with, e.g., underneath, the heating surface of the bottom heater 621. The measurements made by the sensors are sent to the control circuit 600. The control circuit includes a programmable micro-controller (MCU) comprising a microprocessor and memory 630 to receive the measurements from the sensors 610, 611. The signal received by the sensor may have to be converted from analog to digital signal by A/D circuits 631. The MCU has usually an I/O port for receiving a code in computer language, such as C, and the temperature profile. Based on the measured data, the micro-controller 630 compares the data with the temperature profile stored in its memory. The output interface of the micro-controller via D/A circuits 632 connects to a PWM which is the circuit for generating Pulse-Width-Modulation signals as gate signal for AC switches 640. The line voltage is switched on and off at zero crossing so the harmonics are not generated. Those components 633, 640 are for regulating the power to the heating elements 620, 621. The power delivered to the heating surfaces is proportional to the differential between the set point and the sensor signal. Thermal switches 650 are used as a safety measure for thermal runaway protections. A power indicator 670 and manual switches 671 may also be provided to complete the electrical circuit.

The benefits of the profile control is mainly that it allows an optimization of the heating time. When the heating surface is the contact with food or the package of the food as for the present invention, the temperature of the heating surface is the most important factor of heat transfer. However, the temperature of the heating surface has limitation at the late heating stage because the high temperature will cause burnt of the food. Therefore, the profile control enables to heat the food at a higher temperature at the beginning of the heating then to reduce heating as the food becomes closer to the suitable temperature. An exemplary of temperature profile for a given food is shown in Table 1 below in Example 2. Overburning of the food is thus avoided while the heating time can be significantly reduced. After the product is heated to the temperature of serving the device can be turned into a holding mode.

In another embodiment, these heating device of the invention could be used for heating a series of food packages into a stacking device, or be placed similarly into a portable cart for cooking and holding hot. Such stacking embodiment may also be suited to use in airlines where space is at premium.

In yet another embodiment of the present invention, a code can be present on the food container, such as the one of FIG. 6, that is assigned to a particular food, recipe, package size, etc. The heating assembly comprises a reader that reads the code. The reader is provided to convert the code into an operating signal indicating to the control system the heating power to be adjusted as a function of time so as to obtain a proper heating or cooking pattern of the food product. The code may further comprise identification data about the food package that inform the control system via the reader of the origin, brand, type or other identification data of the food package. The control system may include an identification protocol that may consist in comparing the identification code with a stored list of valid verification codes to authorize or not the heating of the food package. The code and reader may transfer data by radio-frequency, bar-code transmission, or any other suitable data transmission systems.

EXAMPLES

Example 1

A 2.7-kg frozen "half-pan" lasagna product with meat sauce is heated with a heating device of the invention to a center temperature of 80° C. while preserving the quality of the food. The "half-pan" meat lasagna of approximately 13 by 10.25 by 2.25 inches dimensions and 2.7 kg (5.9 lb.) mass are used in the experiments to determine heating time when heating surface temperature were controlled at beginning from 130° C. (at the bottom) to 230° C. (at the top), and, at the end of heating, from 110° C. (at bottom) to 180° C. (at the top).

In an initial state, the heating device is set up as two separate circuits: the top heating tray and the bottom heating tray as represented in FIGS. 4 and 5. The voltage generated by the heating device is of about 120 V. The total power at this voltage is calculated using formula $P=V^2/R$ which provides a total of 1400 Watts for both top and bottom heating areas. The average power density as calculated from the total wired area represents approximately 0.8 Watts per square centimeter. Temperature of the heating device is controlled at a preset temperature profile. It takes approximately 60 minutes for the center temperature to reach 80° C. The mass of lasagna exhibits a well-cooked center and with absence of overburned areas in the corners and edges.

Comparatively, the 2.7-kg half pan lasagna product is heated from frozen state (−20° C.) to a warm temperature (71° C. in center as measured by a thermocouple) in a convection oven at thermostat temperature of 149° C. The convection oven is CombiTherm Altosham, Model HUB10-18. It takes approximately 90 minutes for the center of the product to reach the warm temperature of 71° C. (160° F.). The mass presents burned edges and corners. FIG. 12 illustrates in more details the control of heating of the bottom and top heating surfaces. It also shows the heat up of the product over time.

Example 2

Control Scheme

The control of the heating surface temperature is preset according to the heating time using an 8 Micro-Controller Unit (MCU). The temperature signals from sensors at top and bottom heating surfaces are compared with the pre-programmed temperature profile at various time intervals. Namely, the temperature at the beginning of the heating, e.g., 130 to 150° C. at the bottom, is much higher than that at the late heating stage, e.g. 110 to 120° C. at the bottom. The same temperature profile approach is applied to the top heater. The lid of the container is removed for heating. With the container in place in the bottom tray, the upper surface of the food comes as close as possible to the surface of the top heating surface (less than 0.5 mm). In a few points, the top heating surface touches the food surface that is slightly irregular. During heating, the top heating surface provides a combination of convection, radiation and conduction to the food surface. The power of the heating elements is regulated based on the deviations of the sensor signals. The control of temperature is achieved by two temperature sensors for top and bottom heaters. The control power is done through Pulse Width Modulation (PDM) by input sensor signals. The temperatures of the oven, top heating surface and bottom heating surface may be controlled to the same or preferably at different temperatures. The top heating surface may be controlled at a slightly higher temperature than that of bottom. The use of profile control scheme will allow the highest possible energy to heat the food at any point in time, therefore minimizing the heating time. At the end of heating the controller turns the device into a holding mode automatically. The following table represent an exemplary profile control for the half-pan lasagna product of Example 1:

TABLE 1

| Time | Temperature set point (° C.) | |
| --- | --- | --- |
| (Minute) | Top heater | Bottom heater |
| 0 | 250 | 150 |
| 15 | 236 | 135 |
| 35 | 222 | 130 |
| 45 | 208 | 125 |
| 55 | 194 | 120 |
| 65 | 180 | 115 |
| Holding | 80 | 80 |

After a first 15 minutes heating, the temperature control point start to decrease. Another decrease is carried out after 35 minutes heating, then every 10 minutes. At the end of the heating cycle, the heaters are put on hold automatically by the micro-controller at a constant surface temperature regulated at 80° C. As a result, the food can be maintained several hours at a regulated temperature of about 50–55° C. without risks of overburning.

A humidity sensor may be used to detect the doneness of the product. When intensive vapor is generated, the humidity sensor signals that the meal is ready and over-write the profile control to turn the device into a holding mode.

An alternative measure for the insurance is to measure the power to the heater. When the power drops to certain level, it indicates the temperature of the product has reached to a certain degree, therefore it tells the control to turn the device to holding mode. In the holding mode, the heaters (top and bottom) only maintain heater temperature at 80° C.

What is claimed is:

1. An electrical heating assembly adapted to receive at least one food container which has a plurality of food retaining surfaces that demarcate a maximum volume of food that can be retained in the container, wherein the heating assembly comprises at least a first heating tray part and a second heating tray part; with both the first and second heating tray parts being arranged to define, after closing, a closed heating housing around the at least one food container; the housing comprising: heating surfaces with associated resistive elements and having an internal cavity that is configured and dimensioned to receive the at least one food container and to substantially match the shape of one or a plurality of the food retaining surfaces of the food container upon closing of the heating device so that one or more of the heating surfaces of the housing substantially contact the food retaining surfaces of the food container for direct conduction of heat from the heating surfaces to the food retaining surfaces to heat food in the container; and a controlling assembly that controls the temperature of the heating surfaces by profile control whereby the temperature of the heating surfaces sensed by at least one temperature measuring device is compared at one or more regular time intervals to a preset temperature profile stored in a control memory of the controlling assembly.

2. The heating assembly of claim 1, wherein the housing comprises internal resistive heating surfaces that are configured and dimensioned in number and shape to substantially contact all food retaining surfaces of the containers.

3. The heating assembly of claim 1, wherein the heating surfaces of the housing are in the form of supporting non-moveable heating layers that are sized and shaped to receive a defined configuration and shape of food container.

4. The heating assembly of claim 3, wherein the heating layers comprises resistive heating elements and a solid matrix forming the heating surface.

5. The heating assembly of claim 4, wherein the heating surfaces have zones of relatively lower power density and zones of relatively higher power density.

6. An electrical heating assembly adapted to receive at least one food container which has a plurality of food retaining surfaces that demarcate a maximum volume of food that can be retained in the container, wherein the heating assembly comprises at least a first heating tray part and a second heating tray part; with both the first and second heating tray parts being arranged to define, after closing, a closed heating housing around the at least one food container; the housing comprising heating surfaces with associated resistive elements and having an internal cavity that is configured and dimensioned to receive the at least one food container and to substantially match the shape of one or a plurality of the food retaining surfaces of the food container upon closing of the heating device so that one or more of the heating surfaces of the housing substantially contact the food retaining surfaces of the food container for direct conduction of heat from the heating surfaces to the food retaining surfaces to heat food in the container, wherein the heating surfaces are in the form of supporting non-moveable heating layers comprising resistive heating elements and a solid matrix forming the heating surface which heating layers are sized and shaped to receive a defined configuration and shape of food container, and wherein the heating surfaces have zones of relatively lower power density and zones of relatively higher power density, wherein the food container includes bottom and side surfaces and the heating surfaces contacting the container include bottom and side surfaces, wherein the side heating surfaces apply a resistive power density to the side surfaces of the food container that is between 2 to 6 times lower than that applied by the bottom heating surface to the bottom surface of the food container.

7. The heating assembly of claim 6, wherein the heating surfaces include a top surface adapted to heat food in the food container by convection, radiation and/or conduction heating.

8. The heating assembly of claim 5, wherein the housing includes edges or corners that either have no heating elements or form insulated zones for contacting the container.

9. The heating assembly of claim 4, wherein the heating resistive elements are capable of providing an average electrical resistive power density of the heating surfaces of at least 0.45 Watts per square centimeter in at full power but with no localized area of the surface providing more than 1.2 Watts per square centimeter.

10. An electrical heating assembly adapted to receive at least one food container which has a plurality of food retaining surfaces that demarcate a maximum volume of food that can be retained in the container, wherein the heating assembly comprises at least a first heating tray part and a second heating tray part; with both the first and second heating tray parts being arranged to define, after closing, a closed heating housing around the at least one food container; the housing comprising: heating surfaces with associated resistive elements and having an internal cavity that is configured and dimensioned to receive the at least one food container and to substantially match the shape of one or a plurality of the food retaining surfaces of the food container upon closing of the heating device so that one or more of the heating surfaces of the housing substantially contact the food retaining surfaces of the food container for direct conduction of heat from the heating surfaces to the food retaining surfaces to heat food in the container, which further comprises means for measuring temperature at the heating surfaces; and a controlling assembly for receiving an input from the temperature measuring means wherein the controlling assembly controls the temperature of the heating surface when the input reaches a predetermined temperature set point by varying the voltage or time proportioning the electrical current or controlling the amplitude of the alternating current which is sent to the resistive heating elements.

11. The heating assembly of claim 1, wherein the amount of power provided to the food container is controlled from a higher power mode to a reduced power mode as the food product heats up to a predetermined serving temperature.

12. The heating assembly of claim 10, wherein the controlling assembly that controls the temperature of the heating surfaces by profile control whereby the temperature of the heating surfaces sensed by at least one temperature measuring device is compared at one or more regular time intervals to a preset temperature profile stored in a control memory of the controlling assembly.

13. The heating assembly of claim 11, wherein the amount of power is controlled from an average power density in a high power mode of from 0.40 to 0.80 Watts per square centimeter to a reduced power density of less than 0.18 Watts per square centimeter in a reduced power mode.

14. The heating assembly of claim 4, wherein the resistive heating elements comprise wire(s), mat(s), woven or unwoven fabric(s), grid(s), etched foil(s) or tubular heater(s).

15. The heating assembly of claim 1, wherein the heating layers have a solid matrix of a bent, molded or shaped material.

16. The heating assembly of claim 15, wherein the material is a thermoconductive metallic material selected among the group consisting of aluminum, steel, stainless steel, copper, nickel-chromium, nickel-iron-chromium or other heat resistant thermoconductive alloys.

17. The heating assembly of claim 1, wherein the first tray part is a recipient heating tray part which forms a first concave shaped resistive heating surface for receiving the food container in a substantially fixed position within the heating device and the second tray part is a closing plate-shaped member having a resistive heating surface adapted to move relative to the recipient tray part from an opening position wherein the heating device is in an open configuration and a heating position wherein the housing is securely closed.

18. An electrical heating assembly adapted to receive at least one food container which has a plurality of food retaining surfaces that demarcate a maximum volume of food that can be retained in the container, wherein the heating assembly comprises at least a first heating tray part and a second heating tray part; with both the first and second heating tray parts being arranged to define, after closing, a closed heating housing around the at least one food container; the housing comprising: heating surfaces with associated resistive elements and having an internal cavity that is configured and dimensioned to receive the at least one food container and to substantially match the shape of one or a plurality of the food retaining surfaces of the food container upon closing of the heating device so that one or more of the heating surfaces of the housing substantially contact the food retaining surfaces of the food container for direct conduction of heat from the heating surfaces to the food retaining surfaces to heat food in the container, wherein the food container and the tray parts have complementary discrete portions of relief adapted to position the food container only in a limited number of positions within the housing.

19. The heating assembly of claim 18, wherein the number of positions the food container complementary fits the housing is between 2 and 4 inclusive.

20. The heating assembly of claim 17, wherein the first and second heating tray parts comprise a thermally and electrically insulating jacket peripherally adjacent the heating layers of the internal resistive heating surfaces of the housing.

21. The heating assembly of claim 17, wherein the heating layers are removable so as to be replaceable by heating layers sized and shaped to conform to containers of other shapes or dimensions.

22. A portable heating device comprising the heating assembly of claim 1.

23. A method for rapidly heating a food within a container which comprises:
providing a food container having a plurality of food retaining surfaces in a configuration that demarcates a maximum volume of food that can be retained in the container;
providing an electrical heating device comprising a closed heating housing with the housing comprising resistive heating elements and internal heating surfaces and being configured with an internal cavity that substantially conforms to the configuration of one or more of the food container surfaces;
positioning the food container in the housing so that upon, closing of the heating device, the internal heating surfaces of the housing substantially contact one or more food retaining surfaces for direct heat conduction from the internal heating surfaces; and
applying electrical current to the heat resistive elements to transfer heat to heat food in the container by controlling the temperature of the heating surfaces by profile control whereby the temperature of the heating surfaces sensed by at least one temperature measuring device is compared at one or more regular time intervals to a preset temperature profile.

24. The method of claim 23, wherein the housing comprises internal heating surfaces that substantially contact all the surfaces of the containers.

25. The method of claim 23, wherein the power delivered to the heating surfaces is proportional to the differential between a set point and the at least one temperature measuring device.

26. A method for vending food products in food outlets, the method comprising:
providing a heating cavity having thermal conductive heating surfaces;
placing a container including the food product into the heating cavity, wherein the container engages at least one first and one second surfaces of the thermal conductive heating surfaces;
resistively energizing the heating surfaces for heating the food product through conduction of thermal energy to transfer such energy to the food container surfaces to produce a heated food product by controlling the temperature of the heating surfaces by profile control whereby the temperature of the heating surfaces sensed by at least one temperature measuring device is compared at one or more regular time intervals to a preset temperature profile; and
opening the heating cavity and serving the heated food product from the opened cavity.

27. The method of claim 26 in which the heated food product is capable of being held in the heating cavity to keep it warm by controlling the reduction of the power of the heating surfaces.

28. The method of claim 26, wherein the power delivered to the heating surfaces is proportional to the differential between a set point and the at least one temperature measuring device.

29. A heating combination for rapidly heating food which comprises:
a food container having a plurality of food retaining surfaces in a configuration that demarcates a maximum volume of food that can be retained in the container; and an electrical heating device comprising at least a first heating tray part and a second heating tray part; both first and second heating tray parts being arranged to define, upon closing, a closed heating housing around the food container, with the housing comprising internal resistive heating surfaces arranged to receive and substantially match the configuration of the food container so that the food container is substantially in contact with internal resistive heating surfaces of the housing for direct conduction of heat to the food container for heating of food therein via a controlling assembly that controls the temperature of the heating surfaces by profile control whereby the temperature of the heating surfaces sensed by at least one temperature measuring device is compared at one or more regular time intervals to a preset temperature profile stored in a control memory of the controlling assembly.

* * * * *